Jan. 12, 1960 J. B. COPENHEFER 2,920,548
PHOTOGRAPHIC FILM DEVELOPING APPARATUS
Filed Dec. 21, 1955 6 Sheets-Sheet 1
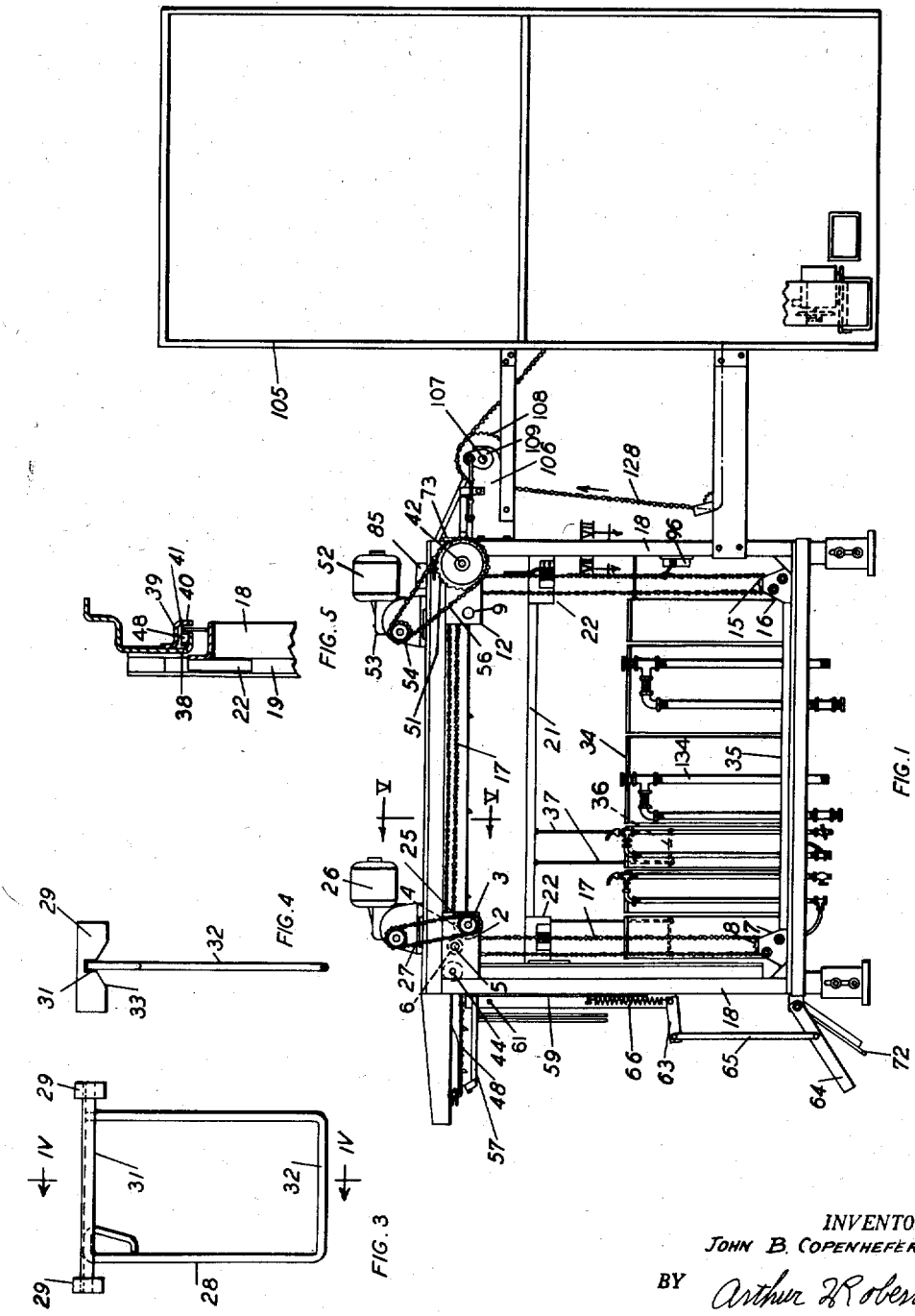
INVENTOR.
JOHN B. COPENHEFER
BY Arthur R Robert
ATTORNEY

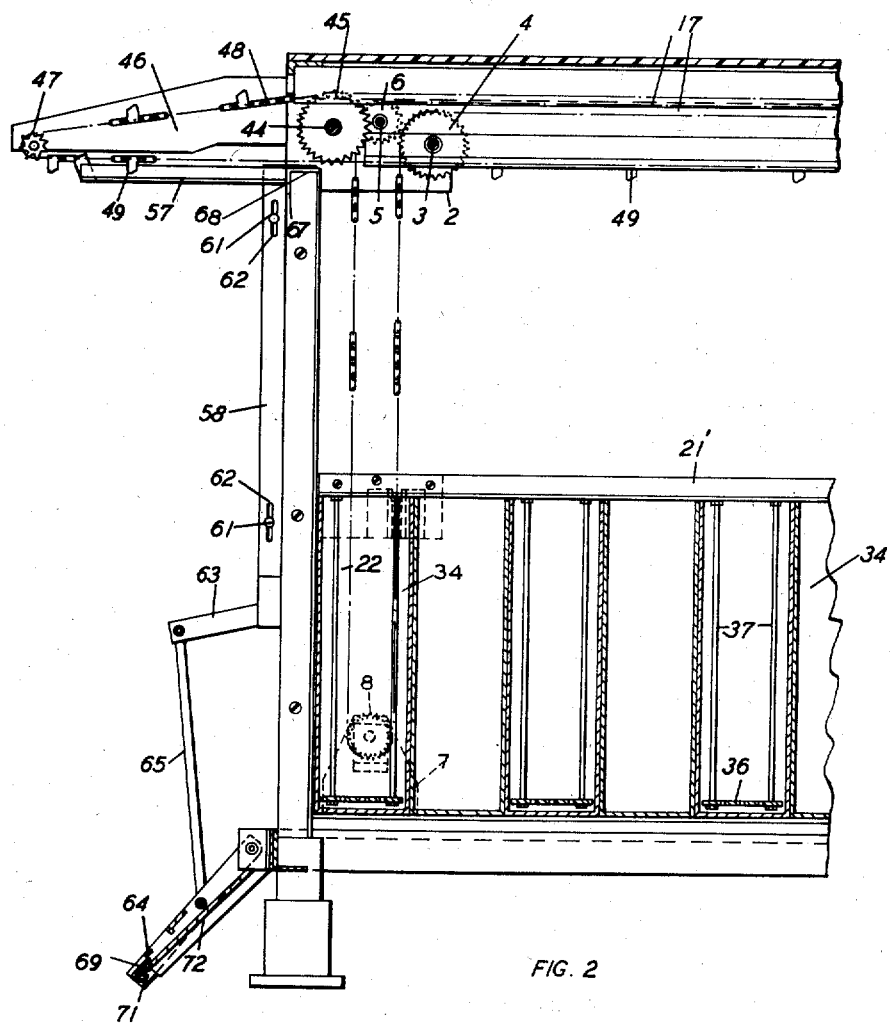

Jan. 12, 1960  J. B. COPENHEFER  2,920,548
PHOTOGRAPHIC FILM DEVELOPING APPARATUS
Filed Dec. 21, 1955  6 Sheets-Sheet 3
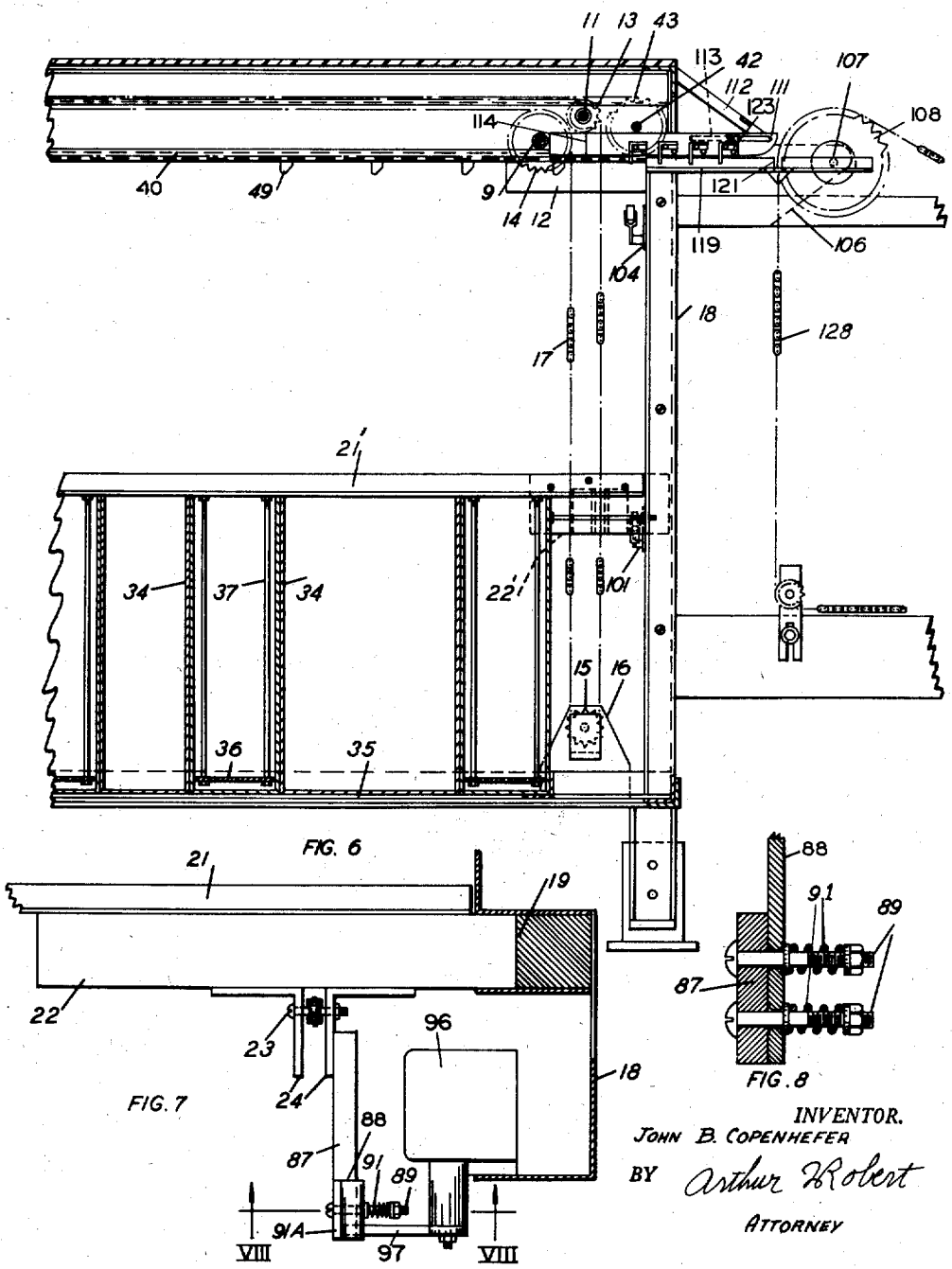
INVENTOR.
JOHN B. COPENHEFER
BY Arthur Robert
ATTORNEY

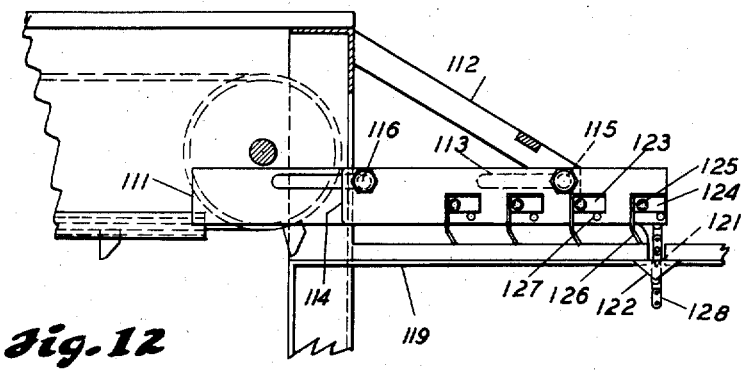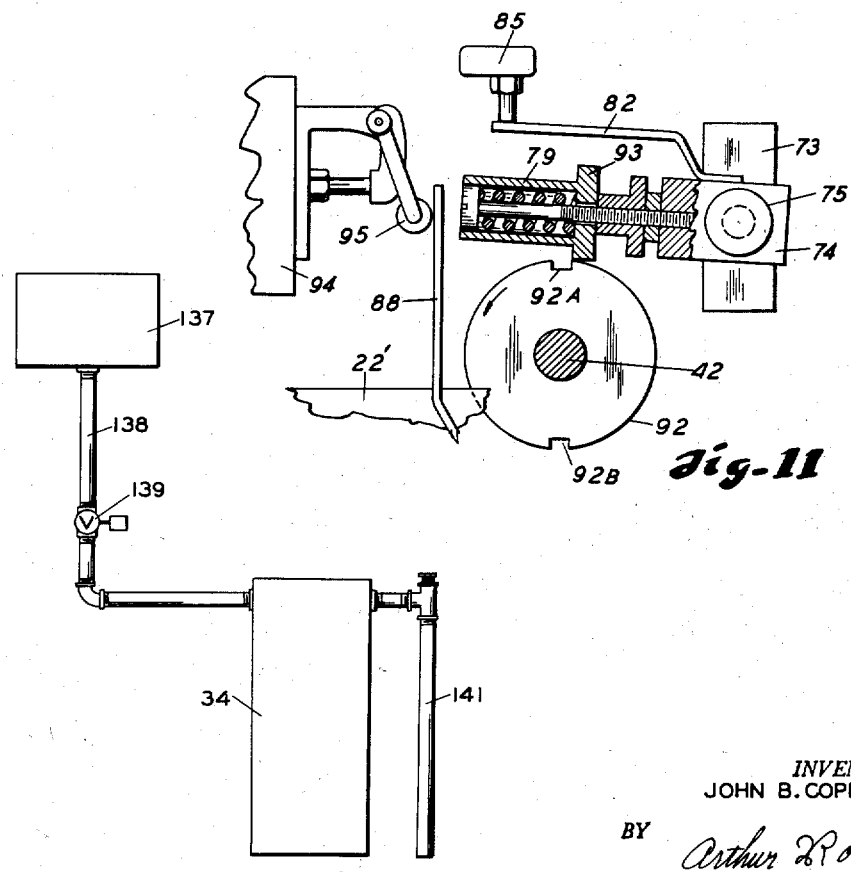

Jan. 12, 1960    J. B. COPENHEFER    2,920,548
PHOTOGRAPHIC FILM DEVELOPING APPARATUS
Filed Dec. 21, 1955    6 Sheets-Sheet 6

INVENTOR.
JOHN B. COPENHEFER
BY Arthur Robert
ATTORNEY

United States Patent Office 2,920,548
Patented Jan. 12, 1960

2,920,548

PHOTOGRAPHIC FILM DEVELOPING APPARATUS

John B. Copenhefer, Louisville, Ky., assignor to Brown-Forman Distillers Corporation, Louisville, Ky., a corporation of Delaware Application December 21, 1955, Serial No. 554,537

13 Claims. (Cl. 95—89)

The present invention relates to an apparatus for automatically processing exposed photographic film, in the form of plates, to develop and fix the image thereon, and relates in particular to apparatus for processing exposed X-ray plates.

The processing of exposed photograph emulsions on sheets or plates involves treatment with a developer, stop, fixer, washer, neutralizer, and other treatments which usually have different durations, so that the provision of an automatic machine for carrying out these operations becomes quite complicated.

It is an object of the present invention to provide a machine for processing photographic plates, which is of relatively simple construction which will rapidly process exposed photographic plates.

A further object is the provision of such an apparatus in which treatments in the various chemical tanks are carried out for equal time periods.

A further object is the provision of a film treating apparatus in which the treating times in the various solutions are equal and adjustable to the desired period.

A further object is the provision of a film treating machine in which separate mechanisms are employed for controlling the treating time in the tanks, and for transferring the film from one tank to another.

According to the present invention, the films to be treated are carried by an elevator so that they are dipped in a treating tank for a predetermined time, and a mechanism is provided to shift the films on the elevator to overlie successive treating tanks. Thus, each time the elevator descends it immerses the films in the proper tank for the desired period, and when the elevator rises, the films thereon are shifted to overlie an adjacent tank. This shifting is done by a separate shifting mechanism which also serves to load the film on the elevator, and to discharge the film from the elevator.

It is preferred to time the dipping or treating period by controlling the stopping period of the elevator in its lowermost position. This may be done by an electric timer, and when the elevator reaches its upper position an interlock mechanism stops the elevator and starts the transfer mechanism to shift the film.

I prefer to treat the film in units of three in each tank, and a singling mechanism is provided at the discharge end which feeds the film, one at a time, to a drier.

The invention will be described in greater detail in the following specification taken in connection with the accompanying drawing illustrating a preferred embodiment by way of example, and wherein:

Figure 1 is a side elevation of the film or plate processing machine and a drier.

Figure 2 is a longitudinal sectional view of the feed end of the film processing machine;

Figure 3 is a front elevation of a film holder, the clamps being omitted;

Figure 4 is a section taken on line IV—IV of Fig. 3;

Figure 5 is a fragmentary cross sectional view of line V—V of Figure 1;

Figure 6 is a longitudinal sectional view of the discharge end of the film developer;

Figure 7 is a fragmentary sectional view taken on line VII—VII of Figure 1 with the elevator near its lower position;

Figure 8 is a section taken on line VIII—VIII of Figure 7.

Figure 11 is a view similar to Figure 9 with the parts in different positions.

Figure 12 is an enlarged longitudinal sectional view of the discharge end showing the singling mechanism;

Figure 15 is a diagrammatic view of the liquid chemical replenishing apparatus.

*Elevator or immersing conveyor*

Figure 9:
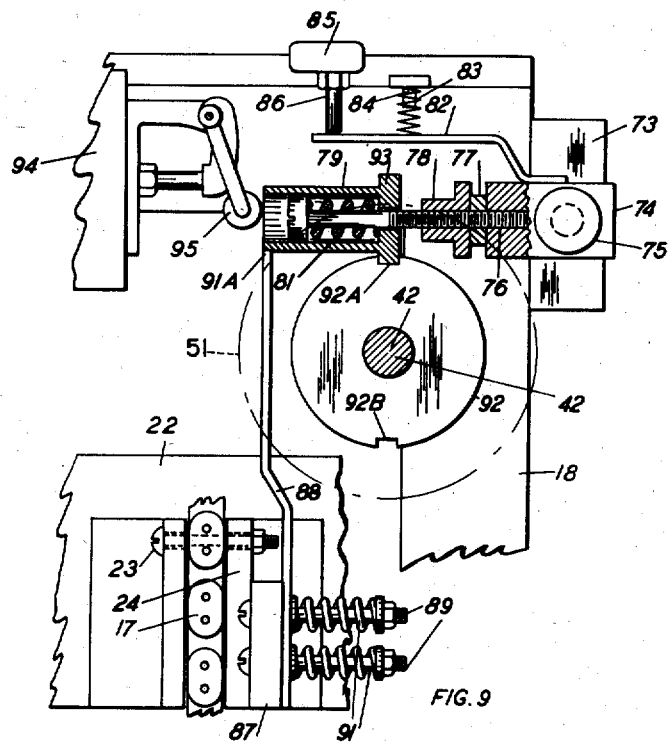
Figure 9 is an enlarged elevational view of the control mechanism for the conveyor and elevator with parts in section.

Referring to the drawing, Figures 1 and 2, the main frame of the machine is constructed of suitable structural steel angle bars. At the top rear or feed end at each side (the upper left end in Figure 1), is located a bearing plate 2, and a drive shaft 3, suitably journalled for rotation therein, carries a drive sprocket 4, adjacent each end. An idler shaft 5 is also journalled in these bearing plates and carries an idler sprocket 6 adjacent each end. At the bottom, the frame carries suitable bearing members 7, one at each side, in each of which is journalled a sprocket 8.

At the forward or discharge end of the machine (Figs. 1 and 6), idler shafts 9, and 11 are journalled in similar bearing plates 12, and these shafts each carry pairs of sprockets 13 and 14 adjacent their respective ends. At the bottom, the frame carries a sprocket 15, at each side, each being suitably journalled in a bearing block 16. An endless chain 17 at each side passes around a drive sprocket 4 (Fig. 2), down and around bottom sprocket 8, up and around sprocket 6, across the top and around sprocket 13 (Fig. 6), down and around sprocket 15, up and around idler sprocket 14, and across the top to drive sprocket 4.

At the four corners of the machine are vertical posts 18 (Figs. 6 and 7) each of which provides a slot or guideway 19. Elevator angle bars 21, 21' have blocks 22, 22' attached thereto at their ends, and these blocks extend beyond the ends of the angle bars and fit into the slots or trackways 19, to guide the elevator bars for vertical movement. These angle bars are jointly designated an elevator. The right vertical runs of the chain 17, as seen in Figure 1, are attached to the guide blocks 22, at the ends of elevator bar 21, by bolts 23 passing through the chains (Fig. 7) and through angle bars 24 attached to the guide blocks. In a similar manner the right vertical runs of the other chain 17 are attached to guide blocks 22' at the ends of elevator bar 21'.

The shaft 3 (Fig. 1) carries a combined sprocket and friction clutch 25 at its end, and shaft 3 is driven through the sprocket and friction clutch by a reversible motor 26 through a gear reducer and chain drive 27. It will be seen that when shaft 3 is driven counterclockwise, the sprockets 4 on shaft 3 drive the chains 17 in a direction to cause the elevator bars 21, 21' to descend, and when this shaft is driven clockwise, these chains cause the elevator bars to descend. The friction clutch 25 allows the motion of the elevator to be abruptly arrested, at the top and bottom limits of its movement, by positioning lugs while the motor and transmission parts, positively driven thereby, can drift by inertia after the elevator is stopped.

Film holders and treating tanks

Each film to be developed is secured in a hanger indicated generally at 28 (Figs. 3 and 4). Each hanger comprises end blocks 29 connected together by a cross rod or channel bar 31, and a U-shaped wire 32 attached to the channel bar. The hanger carries suitable clamps, not shown, for holding the plate or film to be developed in the frame. It will be seen blocks 29 each have an inverted V notch 33 in the bottom, the purpose of which will be later explained.

At the bottom of the machine are a plurality of tanks 34 (Figs. 1, 2 and 6), suitably supported on angle bars 35. A plurality of spaced bars 36 are suspended from the elevator by rods 37 attached to the angle bars 21, 21'. Thus, as the elevator ascends and descends, they cause the bars 36 to ascend and descend and serve as agitators to mix the treating solutions in the tanks. These bars are shaped so as not to interfere with the film hangers when they are suspended in the tanks. The hangers 28, each carrying a film to be developed, are arranged on the elevator with the blocks 29 resting on the horizontal flanges of bars 21, 21' respectively, and thus depend downwardly between these bars. These hangers and the films or plates they carry, are immersed into the respective tanks when the elevator descends, and are withdrawn from the tanks when the elevator ascends. The film frames are advanced step by step on the elevator (as will be presently described) and are positioned so that each time the elevator descends the films are immersed in the next succeeding tank.

Feed conveyor

The means for feeding and progressively advancing or positioning the film hangers on the elevator now will be described. Referring to Figs. 2, 5 and 6, each top longitudinal side bar of the main frame has a lower inturned flange 38, and a cover member 39 is suitably welded in place on the top bar to form a flange 40 with a slit 41 located between the flanges 38 and 40. A drive shaft 42 (Fig. 1) suitably journalled in the forward bearing plates 12, carries a drive sprocket 43 (Fig. 6) adjacent each end, each in alignment with a slit 41. At the rear or feed end an idler shaft 44 (Figs. 1 and 2) journalled in plates 2, carries an idler sprocket 45 at each end, each sprocket being aligned with a slit 41. An extension 46 of the machine at the rear on each side carries an idler sprocket 47. An endless chain 48 at each side passes around drive sprocket 43, rearwardly along the top of the top longitudinal bar, over idler sprocket 45, around sprocket 47, back under sprocket 45, over flange 38, and back to driving sprocket 43. The chains 48 carry fingers 49 extending therefrom at intervals, and as the chains pass over flanges 38 the fingers project downwardly through the slits 41.

The chains 48 are offset inwardly with respect to the angle bars 21, 21' of the elevator so that the fingers 49 extend between these angle bars and project below the bottom flanges thereof. Thus, the fingers will engage the cross rod 31 of a film hanger on the elevator. The shaft 42 is extended to the exterior of the machine and carries a sprocket 51 at its end. The motor 52 drives a gear reducer 53, the output shaft of which has a combined sprocket and friction clutch 54, and a chain 56 connects the sprockets 51 and 54. It will be seen that when the motor 52 intermittently drives the shaft 42, the fingers 49 on chains 48 will engage the frames on the elevator and advance them along the elevator to the proper position above the respective tanks. The friction clutch allows the chains to be stopped abruptly without undue shock on the motor.

Loading rack

Referring to Figs. 1 and 2, a loading rack comprises angle bars 57 at each side, which are welded to the vertical slide bars 58. Suitable stops are provided at the left ends of the angle bars 57. The slide bars 58 are fastened to the inner faces of suitable flanges 59 on the rear posts 18 of the main frame by bolts 61 which pass through vertical slots 62 therein. At the bottom the slide bars each carry a rearward extension arm 63. A foot pedal 64 is suitably swiveled to the frame of the machine, and the links 65 connect the pedal to the extension arm 63. The slide bars 58 are biased to an upward position by the springs 66, which are anchored at their ends to suitable pins in the frame and in the extension arms 63.

When the foot pedal is depressed, the slide bars 58 move the feed rack 57 downwardly out of the path of fingers 49 to inoperative position, in which position the film hangers are loaded on this rack manually, by placing the blocks 29 thereof on the horizontal flanges of the respective angle bars 57. The frame carries abutment blocks 67 so positioned that when the bars 57 of the feed rack are in loading or lower inoperative position, these blocks prevent the film hangers from falling off the forward end of the feed rack. When the foot pedal is released, the loading frame moves upwardly into position so that the fingers 49 on the chains move between the bars 57 and engage the cross rod 31 of a film hanger, to move it forwardly. Bridge plates 68 at the top of the abutment blocks 67 are arranged so that when the film hangers are moved off of the loading rack by the fingers, they slide over the bridge plates onto the flanged side bars 21, 21' of the elevator.

The foot pedal carries a pivoted cross bar 69 from which a hook 71 depends, the hook being located to engage a rigid latch 72 secured to the frame. By rotating cross bar 69 with the foot, the operator can engage the hook and the latch to hold the loading rack depressed, and upon rotating the cross bar in the opposite direction, the hook is disengaged to allow the loading rack to be raised by the springs.

Elevator and feed operation

The operation of the machine so far described will now be explained. The foot pedal 64 is depressed by the operator, and locked in depressed position by engaging the hook 71 with the detent or latch 72. This lowers the bars 57 of the feed rack below the reach of fingers 49. The operator fastens each photographic film or plate in a hanger 28, and positions three of the loaded hangers on the feed rack with the slide blocks 29 resting on the flanges of bars 57, and the blocks more or less in abutting position. The foot pedal now is operated to release hook 71 and the springs 66 raise the feed rack till the flanges of bars 57 are level with the tops of the bridge plates 68. Now, when the motor 52 is started, it drives the chains 48 so that a pair of fingers 49 (one on each chain) engage the cross bar 31 of the rearmost hanger 28 and push the three hangers ahead across bridge plates 68 onto the angle bars 21, 21' of the elevator. The chains are stopped automatically, as will presently be described, when the fingers have advanced enough to bring the film hangers over the first tank 34. Motor 26 now is automatically started in one direction, and drives chains 17 so as to lower the elevator 21, 21' to immerse the film hangers and film thereon into the first tank. The elevator is automatically stopped in its lowermost position to allow the film to remain in tank 34 the desired time, then the motor 26 is actuated in reverse to raise the elevator and the film hangers to the uppermost position. When the elevator reaches its top position it is stopped, and now motor 52 is started automatically to move the chains 48 and thus advance the film hangers to position them over the second tank. At the same time, if there are any film hangers on the loading rack, they are moved by the fingers onto the elevator and are positioned over the first tank. The elevator then is again lowered by operation of motor 26 to immerse the films in the tanks, the operations of raising and lowering being repeated as explained above, until the films have reached the discharge end.

Automatic conveyor and elevator control

The operations of the motors 26 and 52 are automatic, and the controls therefor will now be described. Referring to Figure 9, a bearing block 73 is attached to the machine frame at the forward end at one side, and a pivot block 74 is secured thereto by a headed pivot pin 75. A bolt 76 is threaded into the pivot block and is held in adjusted position by a lock nut 77. A spacer bushing or washer 78 is positioned on the bolt, and the bolt receives a cup 79 at the end, with a spring 81 in the cup engaging the bolt head and an internal flange of the cup. The spring biases the cup to the right. A rigid extension or switch actuating bar 82 is attached to the top of pivot block 74, and a spring 83, on a fixed guide pin 84, engages this extension bar to bias the pivot block counterclockwise. The switch 85 for operating motor 52, has a plunger 86 located to be engaged by the extension 82 when the pivot block 74 turns clockwise.

A block 22 on the elevator carries an extension bar 87 (Figs. 7 and 9) on which is attached a vertical finger 88 loosely held on the bar by bolts 89, and biased against the extension bar by springs 91. As seen in Figure 8, the holes in the finger through which the bolts pass are enlarged and rounded to allow the finger to rock on the extension bar. This finger is so located that when the elevator rises to its uppermost position its end 91A (Fig. 9) engages cup 79 near the left end thereof, thus raising the cup and pivoting pivot block 74 clockwise to cause extension bar 82 to engage plunger 86 to close switch 85, thus starting motor 52 to drive the chains 48.

The shaft 42 has a cam 92 thereon (behind sprocket 51) below cup 79, this cam having diametrically opposed notches 92A, 92B therein. In the position shown in Fig. 9 the flange 93 of the cup 79 is in notch 92A, and the finger 88 is moving upward, in contact with and ready to raise this cup. When the cup is raised the flange 93 leaves the notch 92A, and the cup is pushed back by spring 81 to cause flange 93 to ride on the edge of cam 92, so the block 74 pivots clockwise, and extension 82 is elevated to close switch 85. The retraction of cup 79 allows the finger 88 to pass upwardly to the left of the cup, as shown in Fig. 11. The closing of switch 85 starts motor 52, to drive the conveyor chains 48.

A switch 94 for operating the motor 26 in downward direction, has an actuator 95 positioned rearwardly of the finger 88. While motor 52 is operating, it turns cam 92 on shaft 42 and thus the flange 93 rides on the cam edge to hold extension 82 in raised position to hold switch 85 closed. This running position is shown in Fig. 11. When notch 92B comes opposite flange 93, the flange is forced by spring 83 into the notch, thus retracting extension bar 82 to open switch 85 to de-energize motor 52. The engagement of the notch 92B with flange 93 stops shaft 42 and thus stops the chain 48 and their fingers in predetermined position. However, because of the slip clutch 54, the motor 52 can drift after switch 85 opens, without driving shaft 42.

The momentum of the cam and its driver mechanism turns the cam slightly, thus causing the cam notch 92B to engage flange 93 and push the cup back to the left against the bias of spring 81 into engagement with finger 88, and the cup rocks finger 88 to the left to cause it to engage switch actuator 95 to close switch 94 to start the elevator motor 26 in downward direction. Switch 94 remains closed until positively opened.

The downward movement of the elevator carries block 22 and finger 88 down with the elevator, and the springs 91 return the finger 88 to upright position.

Timing and operating circuit

Figure 10:
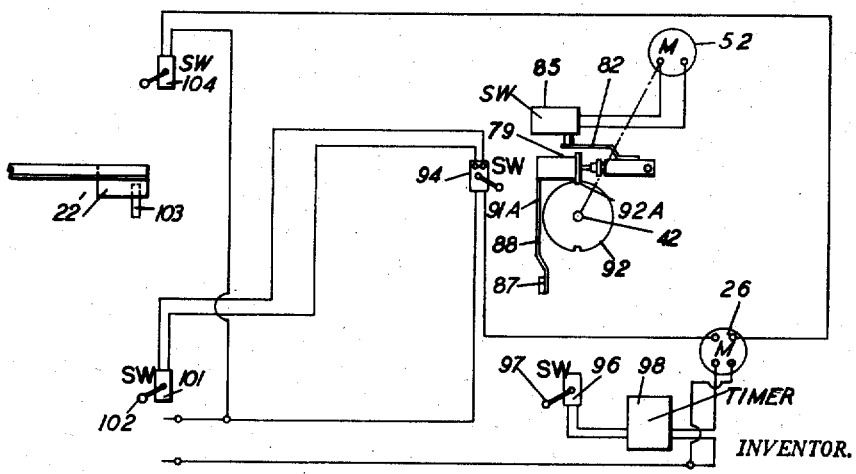
Figure 10 is a diagram illustrating the operation of the control mechanism.

Referring to Figures 1, 7 and 10, near the lowermost position of the elevator, on the forward post of the frame is located a timer actuator switch 96 having an actuator 97 which extends into the path of extension bar 87. This switch is connected to operate a timer 98. On the opposite side of the machine a limit switch 101 (Figs. 6 and 10) fixed on the frame has its actuator arm 102 extending into the path of movement of guide block 22'. A guide finger 103 is located on the outer face of block 22'. When the elevator descends and block 22' reaches its lower position, the finger 103 engages switch actuator arm 102 to open switch 101, and switch 101 is arranged to open switch 94, which in turn de-energizes motor 26. In this lower position, arm 97 is engaged by extension bar 87 to hold the timer 98 energized. The elevator is positively stopped at its lowermost position by any suitable abutment, and the slip clutch 25 allows the motor to drift after its circuit is opened, so as to avoid the shock of an abrupt stop on the motor. The timer 98, energized by switch 96, determines the duration of immersion of the film in the tank, by determining the length of time the elevator remains in its lowermost position. After the predetermined elapsed time for which the timer is set, timer 98 energizes motor 26 in reverse or upward direction to raise the elevator.

A limit switch 104 near the top on the frame (Figs. 6 and 10), on the same side as switch 101, is positioned to be engaged by guide block 22', when the elevator is in its upper position. This switch is in the reverse timer operated circuit. Thus, when the elevator reaches the top position the switch 104 is held open by the block 22' to stop motor 26, and the release of limit switch 96 conditions the motor 26 to be operated downwardly by switch 94. The elevator is stopped in its uppermost position by a positive stop, which may be the top rails of the frame. At the top, the finger 88 lifts the sleeve 79 and flange 93 and closes switch 85 as previously described, to start motor 52.

Operation

The entire operation now will be described. The tanks 34 contain suitable solutions for developing the films. The solutions in the tanks from left to right contain (a) developer, (b) stop, (c) fixer, (d) wash water, (e) hypo-neutralizer wash water, (f) water, (g) water, and (h) water containing a surface active agent. The chemicals are selected to carry out the operations at high speed. Thus, for example, the hypo-neutralizer tank may contain the composition described and claimed in Patent No. 2,688,546, issued Sept. 7, 1954, to Scott et al. It will be noted the last three tanks contain wash water. By providing two water tanks the washing period can be extended to twice the time for the developing period, and the surface active agent in the last tank assists in draining off the water rapidly from the film.

The film hangers are manually loaded on the loading rack 57 in groups of three, and the rack is raised to bring the hangers within the ambit of fingers 49. The chains 48, carrying the fingers 49, advance the three film hangers over the first tank 34, the motion of the chain being stopped by the flange 93 (Fig. 9) entering the cam notch 92B. The advance of sleeve 79 by the momentum of the cam 92 pushes finger 88 against switch actuator 95 to close switch 94 and start motor 26, to cause the elevator to descend and lower the film hangers and films into the first tank. At the bottom of the elevator descent, finger 103 operates switch 101 to open switch 94 and open the circuit of motor 26; and extension 87 operates switch 96 to start timer 98. At the end of the period for which timer 98 is set, it operates motor 26 in reverse to raise the elevator.

The ascent of the elevator carries finger 88 upward to lift sleeve 79, thus raising flange 93 out of notch 92B and raising arm 82 to close switch 85 and start conveyor motor 52, and the engagement of switch 104 by block 22 stops the upward movement of the elevator. The conveyor chains advance the film hangers on the elevator till they are above the second tank, and at the same time the conveyor chains advance a group of hangers from the rack 57 till they are over the first tank. Now, notch 92A has come around to receive flange 93; the lowering of arm 82 opens switch 85 to stop motor 52; and switch 94 is actuated to cause the elevator to descend. The above described cycle of operations is repeated during the operation of the machine.

Transfer mechanism

Figure 14:
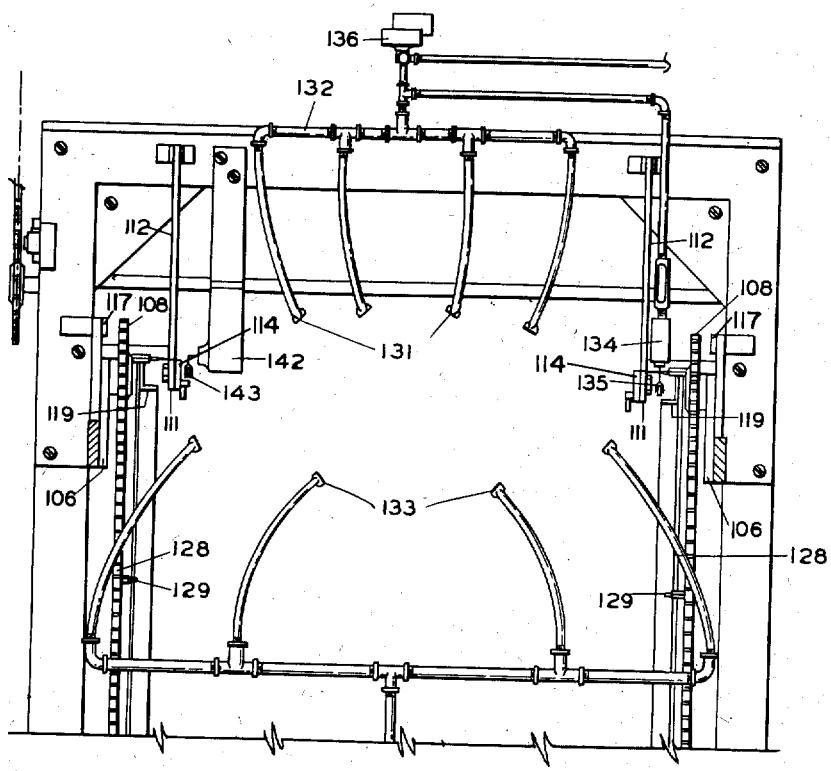
Figure 14 is an enlarged fragmentary end elevational view of the discharge end of the apparatus.
Figure 13:
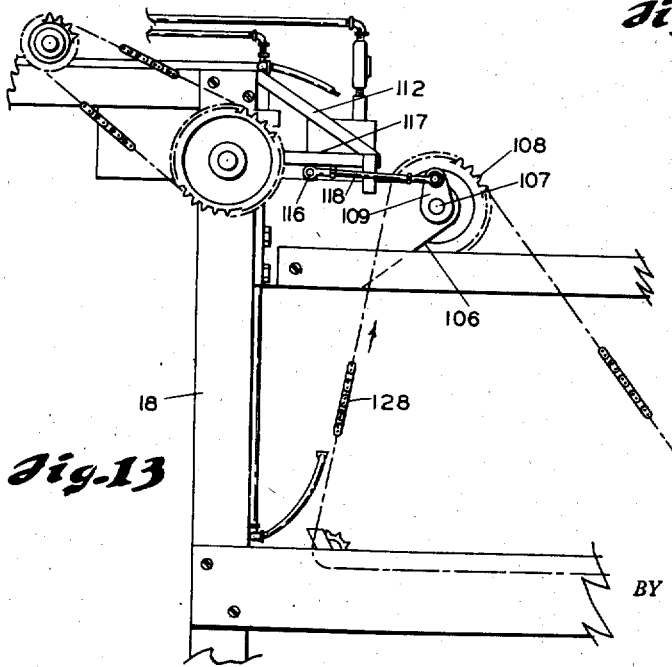
Figure 13 is an enlarged fragmentary elevational view of the discharge end of the apparatus.

The developed films are transferred singly from the developer to a drier 105 (Fig. 1), and the singling transfer mechanism now will be described. At the right end of the machine are a pair of brackets 106 (Figs. 6, 13 and 14), one on each side of the machine, and a shaft 107 in each, carries a sprocket 108 at the interior end, and a crank 109 at the exterior end. At each side, a horizontal guide bar 111 (Figs. 6, 12 and 14), fastened to the frame, is braced by an angular brace bar 112. Each guide bar has a slot 113 therein. A slide bar 114 has a suitable guide pen 115 at one end that passes through the slot 113, to guide the slide bar for horizontal reciprocation. At the rear end an extension pin 116 secured to the slide bar, passes over the top of bracket 106 through a slot provided therewith by a bar 117. A connecting rod 118 joins the extension pin 116 to the crank 109, whereby each crank reciprocates a slide bar. Below each slide bar is a fixed flanged rack bar 119 which is traversed by a slot 121 (Figs. 6 and 12) the parts of bar 119 thus separated being united by a gusset plate 122.

The slide bars 114 each carry a plurality of pawls 123 (Fig. 12) each pawl consisting of a block 124 eccentrically pivoted at 125, and carrying a downwardly extending finger 126. A pin 127 acts as to stop or limit clockwise rotation of the pawl, and the curved end of finger 126 assists the pawl to ride over an obstruction on the movement of the slide bar to the left. It will be seen that when the sprockets 108 are rotated, the cranks 109, acting through connecting rods 118 and extension pins 116, slowly reciprocate the slide bars 114 back and forth horizontally, and the pawls reciprocate with the slide bars.

Rack bars 119 have their inturned horizontal flanges in alignment with the flanges of the elevator bars 21, 21' when the elevator is in raised position, so that the film frames may be transferred smoothly by the conveyor chain fingers 49 from the elevator to the rack bars 119. A pair of chains 128, each carrying inturned fingers 129 at suitable intervals, pass around sprockets 108, the sprockets being so arranged that each finger 129 passes upwardly through a slot 121. Chains 128 are driven in unison by a suitable drive mechanism in the drier, and thus cause the sprockets 108 to reciprocate the slide bars 114 in unison. The slide bars 114 and pawls 123, chains 128 and pins 129 are so synchronized that, on the forward movement of slide bars 114, the pawls 126 engage the cross bar 31 of a film hanger and position the film hanger with the blocks 29 straddling slots 121. Thus, the pins 129 on the two chains, in passing upwardly through the slots 121, enter the V notch 33 and pick up a hanger to carry it and its film to the drier. The V notch, it will be seen, guides the fingers 129 to properly align the hanger on the chains.

Provision is made for blowing the water off of the wet films before they enter the drier chambers. This comprises a plurality of nozzles 131 at the top of the discharge end connected to a header air pipe 132, and nozzles 133 at the sides and bottom similarly connected to a header. The nozzles direct streams of air against the films on each hanger. The air streams or blasts are synchronized by a switch 134 having an arm 135 which is engaged by a cross bar 31 of each hanger to operate a solenoid valve 136 in the air line to time the air blast.

The liquid in the tanks is replenished at intervals to compensate for exhaustion of the chemicals and drag out. The replenishing system is diagrammatically illustrated in Fig. 15, separate from the machine, for the sake of clearness. It comprises a storage tank 137 which may be positioned at the top of the machine, and a conduit 138 leads to a tank 34 in the machine. This conduit 138 contains a solenoid operated valve 139, and vertical overflow pipe 141 is connected to tank 34, this overflow pipe being open at the top to prevent siphoning action. A switch 142 (Fig. 14) at the front end of the machine is actuated by a hanger each time it moves under the actuator arm 143, and actuates solenoid valve 139. Thus, each time a hanger is discharged from the machine, the valve 139 is opened for a short time to allow liquid to flow from reservoir 137 into a tank 34, and any overflow passes out of drain pipe 141. Each tank 34 is provided with its own storage tank 137, and a solenoid valve similar to valve 139, and switch 142 operates all these solenoid valves.

I claim as my invention:

1. A machine for processing photographic film comprising: a frame extending over a succession of film treating-tank areas and having a loading platform at one end thereof; an elevator extending horizontally over said succession of treating areas and having a film receiving end, an opposite film discharging end, and a number of film treating stations therebetween, one positioned over each treating area, said elevator being mounted on the frame for vertical movement between an upper film-advancing position, in which it is positioned to receive film from the loading platform and operative to provide, between its receiving and discharging ends, a path along which the film may be moved from one film station to another, and a lower film treating position in which it is adapted to support film in any one or more of its stations while it is being treated within the corresponding film-treating area; elevator drive means operating cyclically to raise the elevator to its upper position, hold it therein for a predetermined film-advancing interval, and then lower it to its lower position and hold it therein for a predetermined film-treating interval; and film-advancing means operating cyclically to advance any film on the elevator from one station to the next following station during each film-advancing interval when the elevator is stationary in its raised position and simultaneously to feed any available film on the loading platform to the elevator.

2. The machine of claim 1 wherein: said elevator comprises a pair of laterally-spaced rails extending longitudinally in the direction of film travel; and said drive means includes a pair of laterally spaced reversibly-movable chains, one for each rail, each chain presenting a vertical front run link and a vertical rear run link, which reciprocate downwardly and upwardly in unison between the upper and lower positions of the elevator, and means connecting the front and rear links of each chain to the corresponding rail of the elevator.

3. The machine of claim 1 including: means operated at the end of said film advancing movement by the film-advancing means to cause said drive means to institute the downward movement of the elevator.

4. The machine of claim 3 including: means operated by the elevator at the end of its downward movement to stop said elevator drive means; adjustable timing means to hold said elevator in its lower position for a predetermined period during which the film is treated in said tank-treating area, said timing means being operative, at the end of the holding interval, to cause said drive means to institute the upward movement of the elevator; and means, operated by the elevator at the end of its upward movement to stop said elevator drive means and to start said film-advancing means.

5. The machine of claim 1 including: means operated by the elevator at the end of its downward movement to stop said elevator drive means.

6. The machine of claim 1 including: adjustable timing means to hold said elevator in its lower position for a predetermined period during which the film is treated in said tank-treating area, said timing means being operative, at the end of the holding interval, to cause said drive means to institute the upward movement of the elevator.

7. The machine of claim 1 including: means, operated by the elevator at the end of its upward movement, to stop said elevator drive means and to start said film-advancing means.

8. The machine of claim 1 including: a plurality of treating tanks, one in each treating area, each adapted to contain a solution to treat films; means actuated to supply liquid to said tanks in accordance with the number of film that have been immersed therein; and overflow means to maintain a predetermined level of liquid in said tanks.

9. The machine of claim 1 including: a receiving rack aligned at the discharge end of said machine with the raised elevator to receive film therefrom; singling means to position film on said receiving rack in a predetermined position; and transfer means to pick up and remove individually positioned film.

10. The machine of claim 9 including: means located at the receiving rack and operative, when actuated to blast gas against the film to blow off the liquid; and means for actuating said blow-off means when a film enters the blow-off area.

11. The machine of claim 1 wherein: said loading platform and elevator is adapted to support film in the form of a plurality of individual film sheets, each mounted in an individual film hanger.

12. The machine of claim 11 wherein: said elevator includes a pair of laterally-spaced parallel rails extending longitudinally between said film receiving and discharging ends; and each of said film hangers includes a pair of oppositely extending projections slidably supported on and between said rails, said film advancing means sliding said projections along said rails during its advancing operation.

13. The machine of claim 12 wherein: said film advancing means includes a conveyor moving longitudinally of said rails and having a series of longitudinally-spaced depending fingers adapted to engage said hangers and slide them along said rails during the operation of said film advancing means.

References Cited in the file of this patent

UNITED STATES PATENTS

| | | |
|---|---|---|
| 1,061,667 | Gerhard | May 13, 1913 |
| 1,670,673 | Williams | May 22, 1928 |
| 1,840,238 | Long | Jan. 5, 1932 |
| 1,863,689 | Dye | June 21, 1932 |
| 1,985,554 | Smith | Dec. 25, 1934 |
| 2,155,511 | Smijian | Apr. 25, 1939 |
| 2,157,128 | Hershberg | May 9, 1939 |
| 2,183,742 | Hershberg | Dec. 19, 1939 |
| 2,386,781 | Daly | Oct. 16, 1945 |
| 2,453,900 | Gardiner et al. | Nov. 16, 1948 |
| 2,459,509 | Dye et al. | Jan. 18, 1949 |
| 2,518,034 | Ludwig | Aug. 8, 1950 |
| 2,542,830 | Newton et al. | Feb. 20, 1951 |

FOREIGN PATENTS

| | | |
|---|---|---|
| 371,089 | Great Britain | Apr. 21, 1932 |
| 825,047 | Germany | Feb. 21, 1952 |